May 6, 1924.
K. FORBES
NAME PLATE
Filed Sept. 16, 1922
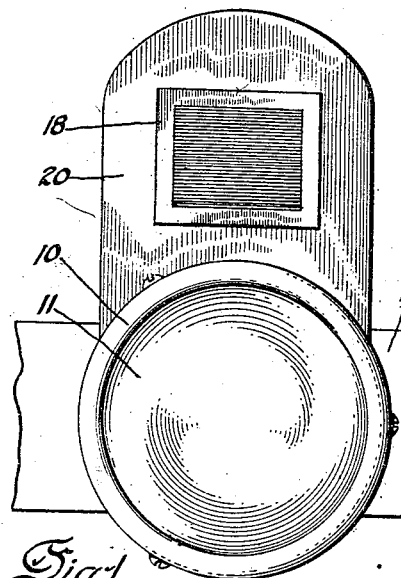
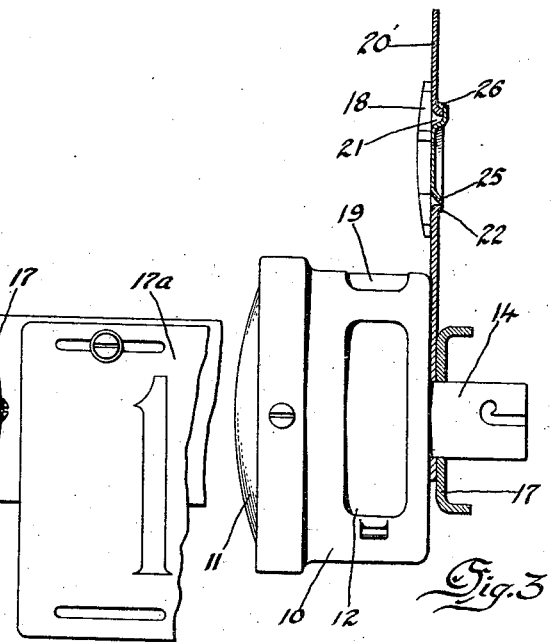
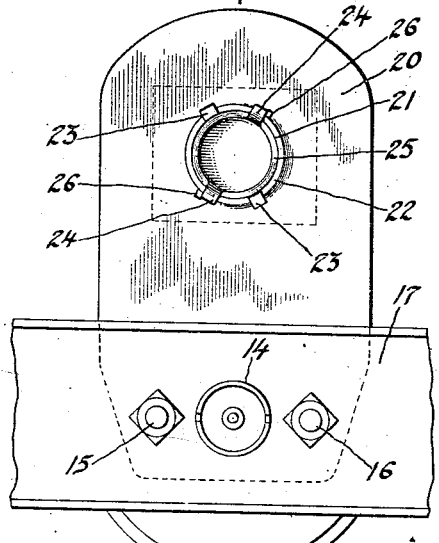
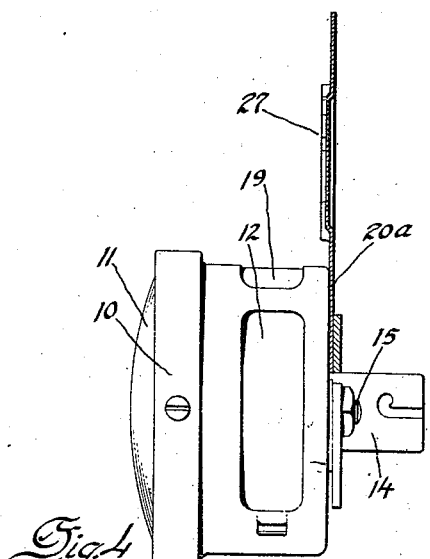
Inventor
Kingston Forbes
By his Attorneys Patented May 6, 1924.

1,493,446

UNITED STATES PATENT OFFICE.

KINGSTON FORBES, OF FLINT, MICHIGAN, ASSIGNOR TO GENERAL MOTORS CORPORATION, OF DETROIT, MICHIGAN, A CORPORATION OF DELAWARE.

NAME PLATE.

Application filed September 16, 1922. Serial No. 588,621.

*To all whom it may concern:*

Be it known that I, KINGSTON FORBES, a citizen of the United States, and a resident of the city of Flint, county of Genesee, and State of Michigan, have invented certain new and useful Improvements in Name Plates, of which the following is a full, clear, concise, and exact description, such as will enable others skilled in the art to which the invention relates to make and use the same, reference being made therein to the accompanying drawings, which form a part of this specification.

This invention relates to automobiles and more particularly to the location and means for supporting a monogram, legend, or name plate thereon.

One of the objects of the invention is the provision of means for supporting a monogram, legend, or name plate at the rear of an automobile in such a position that the same is exposed to view from the rear during either the day or night time.

Another object of the invention is the provision of a legend or name plate support that is simple in construction, cheap to manufacture, that is easily and readily attached and that is provided with simple means for attaching the legend or name plate thereto.

Other and further objects and advantages of the invention will appear from the following description taken in connection with the accompanying drawings in which Fig. 1 is a rear elevation of a tail lamp and support showing my device in position thereon, with parts broken away;

Fig. 2 is a front elevation thereof;

Fig. 3 is a section on line 3—3 of Fig. 2; and

Fig. 4 is a view similar to Fig. 3 but showing a modified form of the device.

It has been the custom from the beginning of the automobile industry, for manufacturers to place name plates or legends on the front of cars, usually on the radiators thereof, for the purpose of identifying the make or manufacturer of the car. The identifying means heretofore employed at the rear of the car, so far as I am aware, has consisted of printing a legend on the tire carrier or some other accessory that is not permanently connected to the car and that is not visible during the night time. It is often desirable, to be able to identify the make of a car from the rear thereof and for this reason novel means have been provided whereby the make of the car may be identified during either night or day and which will at the same time advertise the particular make of car on which the device is employed.

On the drawing, the reference character 10 designates a tail lamp which is provided with the usual lens 11 and side window 12 for illuminating the license plate as is usual in such constructions. The lamp is also provided with the usual connector sleeve 14 and with attaching members such as the bolts 15 and 16 for securing the lamp to its support 17. The member 17 may be any support, that shown being the usual brace or cross member of a tire carrier. The license tag 17ª is secured to the support 17 in proximity to the window 12 in the usual manner.

In order to identify the make of car from the rear a legend or name plate is permanently secured at a convenient point at the rear thereof. The plate may be and preferably is secured in such a position that the light from the tail lamp will illuminate the same. Preferably the plate is supported above and in proximity to a window 19 formed in the top of the tail lamp casing through which the plate is illuminated by light from the lamp although it is understood that it may be otherwise located.

Any suitable means may be provided for supporting the legend or name plate 18 in proximity to the window 19. As shown, a support or plate 20 is provided for this purpose. This plate is provided with openings at its lower end for engaging the sleeve 14 and the bolts 15 and 16, whereby it is adapted to be clamped in position between the lamp and its support 17 as indicated in Figures 3 and 4.

Suitable means are provided for securing the legend or name plate 18 to the supporting plate 20. As shown, the upper end of the plate is provided with an opening which may have a flange 22 extending about the same. Slots or recesses 23 are formed in or through the flange 22 and the plate 20 for the reception of ears 24 carried by the tubular member 25 secured to said legend or name plate. In applying the name plate, the same is turned until the ears 24 register with the recesses 23 in the supporting plate 20 after which the tubular member 25 is inserted in the opening 21 and the name plate turned until the ears 24 come in contact with the stops 26.

In the form of the device shown in Figure 4, the legend 27 is stamped in the plate 20ª. The legend, if desired, may then be enameled in the usual manner.

It is thought from the foregoing description taken in connection with the accompanying drawings that the construction and operation of my device will be apparent to those skilled in the art, and that various changes in size, shape, proportion and details of construction may be made without departing from the spirit and scope of the appended claims.

What I claim is:

1. In a device of the class described, a substantially horizontal supporting member adapted to support a license plate; a second supporting member extending upward from said first mentioned supporting member, and a name plate carried by said second supporting member; and a lamp located adjacent said supporting members and having an upwardly disposed window adapted to illuminate said name plate, and a laterally disposed window adapted to illuminate said license plate.

2. In a device of the class described, a substantially horizontal supporting member adapted to support a license plate; a second supporting member extending upward from said first mentioned supporting member, and a name plate carried by said second supporting member; a lamp located adjacent said supporting members and having an upwardly disposed window adapted to illuminate said name plate, and a laterally disposed window adapted to illuminate said license plate; said second mentioned supporting member lying between said lamp and said first mentioned supporting member; and fastening means for securing said several parts together.

3. In a device of the class described, and in combination with a substantially horizontal tire carrier cross member adapted to support a license plate, an upwardly extending member the lower end of which is in engagement with said cross member, and which supporting member is adapted to support a name plate; a lamp located adjacent said license plate and name plate, and having an upwardly disposed window whereby said name plate is illuminated, and a laterally disposed window whereby said license plate is illuminated; and means for fastening said several parts together.

In testimony whereof I affix my signature.

KINGSTON FORBES.